Patented Oct. 28, 1952

2,615,883

UNITED STATES PATENT OFFICE 2,615,883

PRODUCTION OF LIGNIN, CELLULOSE, AND PENTOSANS

Orland R. Sweeney, Melvin H. Brown, and Lionel K. Arnold, Ames, Iowa, assignors to Iowa State College Research Foundation, Ames, Iowa, a corporation of Iowa No Drawing. Application September 19, 1947, Serial No. 775,156

16 Claims. (Cl. 260—124)

This invention relates to the production of lignin, cellulose and pentosans, together with products thereof. The invention is particularly useful in the recovery of such materials from by-products, such as cornstalks, corncobs, oat hulls, hemp hurds, straws, etc. In excess of 250,000,000 tons of annual crop by-products, such as cornstalks, corncobs, oat hulls, hemp hurds, and straws are produced annually in the United States. These for the greater part are wasted or at the most inefficiently utilized. It is well known that these products consist of three main groups of constituents—cellulose, lignins, and pentosans, together with small amounts of inorganic materials. Processes have been proposed to isolate one constituent more or less substantially pure. For example, cellulose may be isolated in a more or less impure form of paper pulp or the more highly refined alpha cellulose. When this is done, the lignins and pentosans are destroyed or discarded as unusable. It is possible by other treatment to separate the lignin from these materials but in the procedure the cellulose and pentosans are destroyed or discarded. By still other procedures, it is possible to remove the pentosan material and recover it as the pentose sugars or by appropriate treatment with acid convert them to furfural. When this is done, the cellulose and lignin are destroyed. Thus, by the usual methods any one of the three major constituents—cellulose, lignins, and pentosans—may be recovered at the expense of the other two.

An object of the present invention is to provide a process for the recovery of all of these constituents from one batch of raw material in a series of coordinated operations. Yet, another object is to provide a process for the recovery of lignin, cellulose and pentosans, while at the same time recovering the products in a more desirable form and at relatively low cost. Yet, another object is to provide improved products, incorporating the products of the process and having valuable new properties. Other specific objects and advantages will appear as the specification proceeds.

The process may follow several different procedures. In one embodiment of the process, the raw materials, such as corncobs, straws, oat hulls, peanut shells, hemp hurds, bagasse, cornstalks, etc., are digested in acid or in a diluted mixture of mineral acids to remove pentosans. For example, such raw materials may be digested in a diluted mixture of sulfuric, nitric and hydrochloric acids. As a matter of economy, we prefer to use a mixture of sodium nitrate, sodium chloride and sulfuric acid. Other nitrates or chlorides may be employed, if desired. A solution containing about 7% sulfuric and 2.5%, each, of nitric and hydrochloric acids gives unusually good results. The percentages may be varied in processing different raw materials. The digestion may be carried out at atmospheric pressure or above for a time varying from 1 to 6 hours.

After the acid digestion, the liquor is drained or filtered off, and the residual solid matter is washed more or less free of acid with water. The liquor, either alone or with part of the wash water used, may be then heated in a still to drive off furfural, which is formed by the action of the acid upon pentosan material dissolved in the digestion process. The furfural may then be recovered by condensing it in a suitable condenser. If desired, the furfural vapors may be concentrated prior to condensing in rectifying apparatus. The acid remaining after the furfural is distilled out may be run to the sewer or saved for reuse later to precipitate the lignin.

Instead of producing furfural from the acid cook liquor, we may recover the pentosans in the form of the pentose sugars, mainly xylose. To do this, we neutralize the acid by the addition of lime, sodium carbonate, or other alkaline materials and adjust the hydrogen ion concentration of the liquor to the proper amount (approximately pH 4) by the addition of a suitable acid, such as phosphoric. We then concentrate the liquor by heating either in an open kettle or pan under vacuum until the desired concentration is secured. We may prefer to treat the syrup before final concentration with purifying agents, such as bone char, activated charcoal and fuller's earth, to give a syrup of greater purity and lighter color. The xylose may be utilized in the syrup form or the sugar may be crystallized out and removed from the mother liquor by methods well known in industry. The syrup or crystalline xylose may be used in the production of chemical products or utilized in food products.

The solid residue remaining after the removal of the acid liquor, is composed largely of cellulose and lignins. It is next digested in an alkaline solution to remove substantially all the lignins and leaving a residue of cellulose. For example, the solids may be digested with sodium hydroxide, and the alkaline lignin solution may be filtered from the cellulose.

The cellulose, after washing with water and drying, is available for use either directly or after further purification, as paper pulp, plastic filler or alpha cellulose.

The lignin may be recovered from the alkaline solution by several different methods. For example, the lignin solution may be made acid and, in this step, an economical source of acid is the residual acid from the furfural still. A lignin product, which is here designated as "A," precipitates in the acid solution and is filtered out, washed and dried. The filtrate may be then evaporated to dryness and a lignin product recovered, which is here designated as "B." The product "B" is valuable as a constituent of plastic materials, as will be later indicated. Instead of evaporating the entire filtrate to dryness, one may crystallize out all or part of the sodium sulphate dissolved in the filtrate and then evaporate to dryness, the remainder forming the constituent "B." Further, instead of precipitating the lignin from the alkaline solution, the entire solution may be evaporated, part or all of the sodium sulphate having been removed, as above indicated. The final lignin product here is designated as product "C."

If a purer cellulose and greater yield of furfural and lignin is desired, the raw material may be given two acid digestions, the second acid digestion following the first alkaline digestion. After the second acid digestion, the material is then given a second alkaline digestion. The solid residue, after each digestion, is washed well before the next digestion is started. When this variation of the method is used, it is economical to use the acid cook liquor from the second digestion of one batch fortified with additional acid as the first acid cook liquor for a new batch. This acid cook liquor, which has been used in cooking two batches, is distilled to recover the furfural. The second acid digestion is made with fresh acid. Similarly, the alkaline cook liquor from the second alkaline digestion is fortified with fresh sodium hydroxide and used for the first alkaline cook of the following batch. This alkaline cook liquor, which has been used in cooking two batches, is treated with acid to precipitate the lignin or evaporated without acidifying. Fresh sodium hydroxide is used for the second alkaline digestion.

Another embodiment of the process may be set out as follows:

The raw material is digested in the dilute acid solution and steam blown to distill the furfural directly from the acid mixture containing the cellulosic material. The furfural and accompanying steam is condensed and is available for sale or use with or without further rectification to remove part of the water. After the removal of the furfural, the acid cook liquor is filtered off and fortified with additional acid for use on the next batch. The residue is washed with water. The ligno-cellulose material remaining after washing is digested in a sodium hydroxide solution. The alkaline solution is filtered from the cellulose and evaporated becoming constituent "C" of plastic products. The cellulose may be further purified and refined or may be simply washed with water and dried for use in the production of various cellulose derivatives.

The cellulose produced by the procedures outlined may be used in production of paper, insulating board, hard board, or alpha cellulose as a raw material for cellulose products, such as nitrocellulose, cellulose acetate, and viscose. We have found further that it may be used either with or without further comminution as a filler in certain types of plastic products, particularly those which will be described later.

The furfural produced by the above processes may be used for any of the processes employing commercial furfural. We may prefer, however, to use it in the production of plastic products as described later.

We have found that the lignin products "A" and "C" produced by our process are more reactive and are superior to lignins produced by other processes for certain chemical uses. We have found in particular that they are valuable in the production of certain plastics products. We have found further that the product "B" may be used advantageously in certain plastic products, particularly in combination with lignin "A." Since these products may be used in different types of plastics, and since the benefits derived from their use may be different in different type of plastic products, examples of several such uses will be given.

We have found that the lignin products from our process react with phenolic bodies, such as cresols and phenol; aldehydes, such as formaldehyde and furfural; and mineral acids, such as sulfuric and hydrochloric to form a resin which may be made thermosetting by the addition of hexamethylenetetramine. An example of such a resin may be prepared as follows: mix 20 parts of a mixture of lignins "A" and product "B" (in the proportions obtained by the above process), 15 parts cresol, 7 parts formaldehyde (37½%), and 5 parts concentrated sulfuric acid (sp. gr. 1.84), and heat for 10 minutes at 150° C. Cool and grind to a fine powder. This powdered resin may be used in the production of a molding powder suitable for molding thermalsetting plastics. For this purpose, 33.7 parts of the resin prepared above may be mixed with 3.4 parts lime, 1.7 parts hexamethylenetetramine, 0.8 parts aluminum stearate, and 39.6 parts of asbestos. This molding powder molds satisfactorily at 160° C., and 5000 pounds per square inch for 4 minutes. The resulting product is a hard, black, strong plastic.

The above is given only as an example and may be varied both as to constituents, proportions, pressure, and temperature. For example, phenol may be substituted for the cresols, lignin "C" may be used in place of lignin "A" and product "B." Other lignins may be used although we have found those produced by our process to produce a superior product. Other lubricants than aluminum stearate may be used, and other aldehydes, such as furfural, for the formaldehyde. Further, we do not limit ourselves to the use of asbestos as a filler, but prefer to choose the filler on the basis of cost, availability, and suitability for the purpose for which the finished product is to be used. For certain purposes, we may prefer to use the cellulose produced by our process as a filler in the plastic and to substitute the furfural produced in our process for part of the aldehyde in the resin. Thus, all of the products from our process might be used in the production of one plastic product.

Certain modified coumarone-indene resins prepared by the catalytic polymerization of coumarone and indene from solvent naptha, a coal tar product, are low in cost and have plastic properties. They are limited in their usefulness as plastic resins since they are thermoplastic and not thermosetting. Another type of thermoplastic resin low in cost is obtained in the extraction and purification of rosin from southern pine.

This material has a melting point of 110° to 120° C., an acid number of 95, a saponification number of 125, a methoxy content of 6, and average molecular weight of 420. For purposes of identification we will designate this as resin "D." We have found that mixtures of these resins, like the individual resins, are thermoplastic but of limited value as molding materials. We have discovered that mixtures of coumarone-indene resin and either resin "D" or rosin with the lignin products produced by our method together with sulphuric acid will produce high grade thermosetting plastics which may be molded easily.

By way of example, the molding material may be prepared as follows: Take 13 parts lignin "A"; 10 parts resin "D"; 10 parts coumarone-indene resin, having a melting point range of 100–125° C.; 1 part concentrated sulfuric acid (sp. gr. 1.84); and 5 parts water and heat together at 300° for 10 minutes. Cool and grind to a fine powder. This powdered resin may be used in the production of a molding powder suitable for molding thermalsetting plastics. For this purpose, 20 parts of the powder are mixed with 1 part hexamethylenetetramine and 20 parts of asbestos filler. This molding powder may be satisfactorily molded at 200° C. and 5000 pounds per square inch pressure for 3 minutes. The product is a hard, black, strong, and water-resistant thermosetting material. The above is given only as an example of a procedure which has given good results but which may be varied considerably without departing from the spirit of the invention. A mixture of lignin "A" and product "B" may be substituted for lignin "A." Lignin "C" may also be used instead of lignin "A." Lignin from other sources may be used, but we have found that produced by our process gives a superior product. Other coumarone-indene resins, having similar properties, may be substituted. Wood rosin, or colophony, may be substituted for resin "D." Proportions, temperatures, and pressures may be varied. Other fillers than asbestos may be used, including the cellulose produced by our process.

Resin "D," colophony, or similar resin, may be put into a solution or colloidal suspension in an alkaline solution. When aluminum sulfate or aluminum sulfate and a mineral acid is added, the resin is precipitated. (The acid is desirable in preventing the formation of colloidal material which would interfere with filtration.) If the solution or suspension is stirred with a suitable filler, such as wood flour, the resin may be precipitated onto the filler where it is adsorbed. The liquid may then be filtered from the filler and the precipitated resin. After drying, the filler and resin may be molded as a thermoplastic material. We have found that this thermoplastic material may be made thermosetting by the addition of one or more of the lignin products previously described.

An example of the above is as follows: Dissolve 8 parts of resin "D," 0.8 parts lignin "A," and 2 parts sodium hydroxide in 40 parts water and add with stirring 8 parts wood flour. Add with stirring 5 parts of aluminum sulfate dissolved in 50 parts water and 30 parts of 10 percent hydrochloric acid. Filter out the solid mixture and add to it 0.4 part lime and 2 parts product "B." When dry, this product may be molded at 160° C., and 5000 pounds per square inch for 4 minutes to give a strong thermosetting product of pleasing color.

The above procedure is given as an example only and may be varied as to proportions, temperatures, and molding pressures. Lignin "C" may be used instead of product "B" and lignin "A."

Lignins from other sources may be used, but we have found that the lignins produced by our process give a better product. Instead of using only resin "D" and lignin, we may prefer to dissolve with them suitable resins, such as phenolic resins or aniline-formaldehyde resins, precipitating the mixture of resins onto the filler. Instead of adding phenolic resin, we may prefer to add phenol and formaldehyde (or other aldehydes) directly to the solution. Similarly, we may add aniline and formaldehyde. In place of resin "D," we may use colophony or wood rosin. We do not limit ourselves to wood flour as a filler, but may prefer to use other fillers, including the cellulose produced by our process.

In the manufacture of liquid resin from phenol and formaldehyde, the amount of water produced in the reaction, together with that present in the formaldehyde, may so dilute the resin as to make necessary the removal of some of the water by evaporation prior to the addition of the filler. We have found that by the addition of our lignin products to form a part of the resin, we may decrease the percentage of water present as well as to substitute a considerable portion of the phenolic resin by the lignin material.

Liquid phenolic resin can be made as follows: Take 10 parts phenol, 15 parts formaldehyde (37½%) and 1 part solid sodium hydroxide, and heat for 2 hours at 70° C.

An example of a plastic mixture of liquid phenolic resin and lignin is as follows: Mix 30 parts of the liquid phenolic resin with 15 parts of lignin "C." To this mixture add 120 parts wood flour and mix well. Mold at 160° C., 2000 pounds per square inch for 4 minutes. A hard, strong, black water-resistant plastic is produced.

The above procedure is given only as an example, it being possible to vary the proportions, temperatures, and pressure. As much as 15 parts additional water may be added for molding certain types of products. For other uses, we may prefer to dry the mixture before molding. In this case, a smaller amount of filler is used. The lignin may be added to the original phenol-formaldehyde-sodium-hydroxide mixture, or may be added to the finished liquid resin. Lignins from other sources may be used, but we have found that those produced by our process give a superior product. We have found also that it may be advantageous to add certain other materials, such as glycerol, to act as a mold lubricant. Further, we do not limit ourselves to the use of wood flour as a filler as other fillers commonly used with liquid resins may be used. For example, we have found the cellulose produced by our process is a very satisfactory filler.

A liquid resin may be made from urea and formaldehyde. We have found that this resin may be improved by the addition of our lignin products so as to produce a resin with less water without having to evaporate off a portion of the water and also that the resin, so produced, will remain liquid for a period of one to three weeks, whereas a similar resin without the lignins would gel in a few hours. This is a great convenience in molding the product as sufficient liquid resin may be made ahead in one batch and used over a considerable period of time.

The above process may be carried out as follows: Heat 8 parts urea, 24 parts of 37½% formaldehyde, 16 parts of lignin "C," 0.8 part sodium hydroxide at 80° C. for 30 minutes. Add 2.4 parts water and cool. Mix 10 parts of this liquid resin with 40 parts sawdust and mold at 150° C. at 300 pounds per square inch for 4 minutes. The resulting material is a light-colored product suitable for use as panel board and the like. This procedure is given only as an example as it is possible to vary the filler, temperatures, pressures, and proportions to form other types of plastic products. For example, we may prefer to use the cellulose produced by our process as a filler for certain types of products. A mixture of lignin "A" and product "B" may also be used instead of lignin "C." Lignins from other sources may be used, but we have found those produced by our process produce a superior product.

Phenol and formaldehyde can be reacted together to produce what are known as casting resins, which may be poured as liquids into molds where they solidify to form the finished plastic piece. We have found that our lignin material may be added to phenol and formaldehyde to form a casting resin which sets to form a hard, tough product. We have found also that the lignin-phenolic casting resin sets more rapidly in the mold than the ordinary phenolic product. This is a distinct advantage since it reduces the number of molds necessary for production at a given capacity.

As an example, the lignin-phenolic casting resin may be produced as follows: Mix 5 parts of phenol, 5 parts lignin "C," 5 parts 37½% formaldehyde, and 1 part sodium hydroxide. Heat at 90° C. until dissolved, pour into a mold, and heat for 3 hours. The finished piece may then be removed from the mold. The product is a hard, tough, black material. Instead of lignin "C," lignin "A," or a mixture of "A" and product "B" may be used. Variations in the amounts, temperatures, and times may be made without departing from the basic idea of the invention. All or part of the formaldehyde may be substituted by other aldehydes, such as, for example, the furfural produced in our process.

Resorcinol and formaldehyde also react together to form a casting resin. We have found that the addition of our lignin materials to this type of resin not only produces a high grade product but one that sets more rapidly, thus allowing greater production with a given number of molds. As an example, the product may be made as follows: Mix 5 parts lignin "C," 2 parts resorcinol, 3 parts 37½% formaldehyde, 1 part water, and 0.4 part sodium hydroxide. Pour into molds and heat in mold at 90° C. for 10 minutes. The above is given only as an example but may be varied as to proportions, temperatures, and times. We have found that, instead of heating the product in the mold, it may be allowed to solidify at room temperature, this setting-up requiring several hours. Thus, for a factory operating only one shift per day, it would be possible to fill the molds before closing for the day and allow the product to set up over night at room temperature. Lignin "A," or a mixture of lignin "A" and product "B," may be substituted for lignin "C" in the above formula. Lignins from other sources may be used, but we have found that those produced by our process produce a superior product. In this, as in other examples, when sodium hydroxide is specified as a catalyst, it is obvious that other alkaline catalysts may be substituted, such as potassium hydroxide, ammonium hydroxide, and the like.

While in the foregoing specification, we have set forth embodiments of the process in great detail, it will be understood that such details may be varied widely by those skilled in the art without departing from the spirit of our invention.

We claim:

1. In a process for the treatment of crop by-products containing cellulose, lignins and pentosans to recover all of said constituents from a single batch of raw material, the steps of acid-treating such a product by contacting it with an acid solution to extract the pentosans into the acid solution, withdrawing the pentosan-containing acid solution from the solids, separating the pentosans from the withdrawn solution, digesting said solids in an alkaline solution to remove the lignins, withdrawing the solution from the cellulose, and separating the lignins from the latter solution.

2. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans into the form of furfural in the acid solution, separating the pentosan containing acid solution from the solids, distilling the solution to separate the furfural, condensing said furfural, digesting said solids in an alkaline solution to remove the lignins, separating the solution from the cellulose, and separating the lignins from the latter solution.

3. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans in the form of furfural into the acid solution, subjecting the solution to steam to remove furfural with the steam, condensing the furfural and steam, digesting said solids in an alkaline solution to remove the lignins, withdrawing the solution from the cellulose, and separating the lignins from the latter solution.

4. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans into the acid solution, withdrawing the solution from the solids, changing the pH of the solution to about pH4, concentrating the solution to recover the pentosans, digesting the solids in an alkaline solution to remove the lignins, withdrawing the solution from the cellulose, and separating the lignins from the latter solution.

5. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans into the acid solution, withdrawing the solution from the solids for the separation of said pentosans, digesting said solids in an alkaline solution to remove the lignins, withdrawing the solution from the cellulose, and separating the lignins from the latter solution by evaporating the solution to dryness.

6. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans into the acid solution, withdrawing the solution from the solids for the separation of said pentosans, digesting said solids in an alkaline solution to remove the lignins, withdrawing the solution from the cellulose, and separating the lignins from the latter solution by acidifying the solution to precipitate lignin.

7. In a process for the treatment of crop by-products containing cellulose, lignins, and pentosans to recover all of said constituents from a single batch of raw material, the steps of acid-treating such a product by contacting it with an aqueous solution containing at least one acid selected from the the group consisting of sulfuric, nitric, and hydrochloric acids to extract the pentosans into the acid solution, withdrawing the solution from the solids for the separation of said pentosans, digesting said solids in an alkaline solution to remove the lignins, withdrawing the solution from the cellulose, and separating the lignins from the latter solution by acidifying the solution to precipitate lignin, removing the precipitated lignin, and evaporating the solution to dryness.

8. In a process for the treatment of crop by-products containing cellulose, lignins, and pentosans to recover all of said constituents from a single batch of raw material, the steps of acid-treating such a product by contacting it with an aqueous solution containing at least one acid selected from the group consisting of sulfuric, nitric, and hydrochloric acids to extract the pentosans into the acid solution, withdrawing the solution from the solids for the separation of said pentosans, digesting said solids in an alkaline solution to remove the lignins, withdrawing the solution from the cellulose, and separating the lignins from the latter solution by lowering the temperature to crystallize sodium sulfate, removing the crystallized material, and evaporating the remaining solution to dryness.

9. In a process for the treatment of crop by-products containing cellulose, lignins, and pentosans to recover all of said constituents from a single batch of raw material, the steps of acid-treating such a product by contacting it with an aqueous solution containing at least one acid selected from the group consisting of sulfuric, nitric, and hydrochloric acids to extract the pentosans in the form of furfural into the acid solution, separating the solution from the solids, steam-distilling the solution, condensing the steam and furfural vapors, digesting the solids in an alkaline solution, separating the solution from the cellulose, and evaporating the solution.

10. In a process for the treatment of crop by-products containing cellulose, lignins, and pentosans to recover all of said constituents from a single batch of raw material, the steps of acid-treating a batch of such products by contacting it with an aqueous solution containing at least one acid selected from the group consisting of sulfuric, nitric, and hydrochloric acids, to extract pentosans into the acid solution, separating the solution from the solids, reusing the solution for the treatment of another batch of such products, distilling the solution to separate the furfural vapors therefrom, condensing said furfural vapors, digesting said solids in an alkaline solution to remove the lignins, separating the solution from the cellulose, and separating the lignins from the latter solution.

11. In a process for the treatment of crop by-products containing cellulose, lignins, and pentosans to recover all of said constituents from a single batch of raw material, the steps of digesting such a product with a mineral acid solution to extract the pentosans into the acid solution, withdrawing the solution from the solids, digesting said solids with sodium hydroxide to remove the lignins in the alkaline solution, separating the solution from the cellulose, and separating the lignins from the latter solution.

12. In a process for the treatment of crop by-products containing cellulose, lignins, and pentosans to recover all of said constituents from a single batch of raw material, the steps of digesting such a product with an aqueous solution containing a mixture of sulfuric, nitric and hydrochloric acids to extract the pentosans into the acid solution, separating the solution from the solids, digesting said solids in an alkaline solution to remove the lignins, separating the solution from the cellulose, and separating the lignins from the latter solution.

13. In a process for the treatment of crop by-products containing cellulose, lignins, and pentosans to recover all of said constituents from a single batch of raw material, the steps of digesting such a product with an aqueous solution containing a mixture of mineral acids consisting of about 7% sulfuric, 2½% nitric, and 2½% hydrochloric acids to recover the pentosans in the acid solution, withdrawing the solution from the solids for the separation of said pentosans, digesting said solids in a solution of sodium hydroxide to remove the lignins, separating the cellulose from the solution, and separating the lignins from the latter solution.

14. In a process for the treatment of crop by-products containing cellulose, lignins, and pentosans to recover all of said constituents from a single batch of raw material, the steps of digesting such a product with an aqueous solution containing a mixture of sulfuric acid, a nitrate, and a chloride to extract the pentosans into the acid solution, separating the solution from the solids, digesting said solids in an alkaline solution to remove the lignins, separating the solution from the cellulose, and separating the lignins from the latter solution.

15. In a process for the treatment of crop by-products containing cellulose, lignins, and pentosans to recover all of said constituents from a single batch of raw material, the steps of digesting such a product with an aqueous solution containing a mixture of sulfuric acid, sodium nitrate, and sodium chloride to remove the pentosans in the acid solution, separating the solution from the solids, digesting said solids in an alkaline solution to remove the lignins, separating the solution from the cellulose, and separating the lignins from the latter solution.

16. In a process for the treatment of crop by-products containing cellulose, lignins, and pentosans to recover all of said constituents from a single batch of raw material, the steps of digesting such a product with an aqueous solution containing a mixture of sulfuric and nitric acids to extract the pentosans into the acid solution, separating the solution from the solids, digesting said solids in an alkaline solution to remove the lignins, separating the solution from the cellulose, and separating the lignins from the latter solution.

ORLAND R. SWEENEY.
MELVIN H. BROWN.
LIONEL K. ARNOLD.

REFERENCES CITED

The following references are of record in the file of this patent:

UNITED STATES PATENTS

| Number | Name | Date |
|---|---|---|
| 1,538,269 | Colas et al. | May 19, 1925 |
| 1,750,903 | Phillips | Mar. 18, 1930 |
| 2,068,926 | Nevin | Jan. 26, 1937 |
| 2,200,784 | Wallace | May 14, 1940 |
| 2,209,289 | Wallace | July 23, 1940 |
| 2,227,219 | Fiedler | Dec. 31, 1940 |
| 2,242,601 | Wallace | May 20, 1941 |
| 2,404,840 | Harvey | July 30, 1946 |
| 2,406,867 | Tomlinson et al. | Sept. 3, 1946 |